(12) United States Patent
Chen et al.

(10) Patent No.: US 11,183,722 B2
(45) Date of Patent: Nov. 23, 2021

(54) SECONDARY BATTERY AND TOP COVER ASSEMBLY THEREOF

(71) Applicant: Contemporary Amperex Technology Co., Limited, Ningde (CN)

(72) Inventors: Xinxiang Chen, Ningde (CN); Shoujun Huang, Ningde (CN); Chengyou Xing, Ningde (CN); Yulian Zheng, Ningde (CN); Peng Wang, Ningde (CN)

(73) Assignee: Contemporary Amperex Technology Co., Limited, Ningde (CN)

( * ) Notice: Subject to any disclaimer, the term of this patent is extended or adjusted under 35 U.S.C. 154(b) by 260 days.

(21) Appl. No.: 16/413,762

(22) Filed: May 16, 2019

(65) Prior Publication Data

US 2019/0355944 A1  Nov. 21, 2019

(30) Foreign Application Priority Data

May 18, 2018 (CN) .......................... 201820743084.1

(51) Int. Cl.
*H01M 50/147* (2021.01)
*H01M 50/183* (2021.01)
(Continued)

(52) U.S. Cl.
CPC ..... *H01M 50/147* (2021.01); *H01M 10/0525* (2013.01); *H01M 50/183* (2021.01); *H01M 50/342* (2021.01); *H01M 50/531* (2021.01); *H01M 50/543* (2021.01); *H01M 50/578* (2021.01); *H01M 2200/20* (2013.01)

(58) Field of Classification Search
CPC ............ H01M 2/04; H01M 2/26; H01M 2/08; H01M 2/34; H01M 2/12; H01M 10/0525
See application file for complete search history.

(56) References Cited

U.S. PATENT DOCUMENTS

| 2012/0114979 A1* | 5/2012 | Kim | ..................... H01M 50/578 |
| | | | 429/7 |
| 2015/0236316 A1* | 8/2015 | Shimizu | .............. H01M 50/155 |
| | | | 429/56 |
| 2017/0047630 A1 | 2/2017 | Cherng | |

FOREIGN PATENT DOCUMENTS

| EP | 0554535 A1 | 8/1993 |
| EP | 2293364 A1 | 3/2011 |
| KR | 10-20050020036 A1 * | 3/2005 |

OTHER PUBLICATIONS

Machine Translation of: KR 1020050020036, Cheng et al., Mar. 4, 2005.*

(Continued)

*Primary Examiner* — Kenneth J Douyette
(74) *Attorney, Agent, or Firm* — Bejin Bieneman PLC

(57) ABSTRACT

The present disclosure provides a secondary battery and a top cover assembly thereof. The top cover assembly includes: a top cover plate and a valve sleeve. The top cover plate includes an accommodation groove and a valve part protruding upward from a bottom wall of the accommodation groove, and the valve part is provided with at least one gas exhaust hole that communicates with an interior of the secondary battery. The valve sleeve is located in the accommodation groove and covers the valve part, a gas exhaust passage that communicates with outside is disposed between the valve sleeve and the valve part, and the gas exhaust passage communicates with the at least one gas exhaust hole.

9 Claims, 3 Drawing Sheets

(51) Int. Cl.
*H01M 50/342* (2021.01)
*H01M 50/531* (2021.01)
*H01M 10/0525* (2010.01)
*H01M 50/543* (2021.01)
*H01M 50/578* (2021.01)

(56) References Cited

OTHER PUBLICATIONS

European Search Report for EP 19173533 dated Sep. 10, 2019 (7 pages).

* cited by examiner

SECONDARY BATTERY AND TOP COVER ASSEMBLY THEREOF

CROSS-REFERENCE TO RELATED APPLICATIONS

The present disclosure claims priority to Chinese Patent Application No. 201820743084.1, filed on May 18, 2018, the content of which is incorporated herein by reference in its entirety.

TECHNICAL FIELD

The present disclosure relates to the technical field of energy storage devices, and in particular, to a secondary battery and a top cover assembly thereof.

BACKGROUND

A secondary battery, such as a lithium-ion battery, produces gas during long-term use. Then, internal pressure of the battery would increase due to the gas production, thereby causing a case of the battery to bulge and deform. As a result, the battery performance decreases.

When gas inside the secondary battery reaches a certain pressure, it can be exhausted through e.g. a vent. However, the vent is a disposable component. That is, the battery will be destroyed once the battery performs exhausting through the vent. Therefore, the vent has a limited use. Moreover, the current vent cannot solve the problem of gas pressure increasing caused by slow gas production inside the secondary battery.

Therefore, this requires a person skilled in the art to provide a technical solution, which can not only guarantee that the internal pressure does not excessively increase when gas is slowly produced inside the secondary battery, but also prevent excessive gas from being exhausted, which would otherwise cause the deformable plate not to be deformed, etc. In this way, the safety of the secondary battery can be improved.

SUMMARY

The present disclosure provides a secondary battery and a top cover assembly thereof, aiming to meet the above requirements and improve safety of the secondary battery.

The present disclosure provides a top cover assembly of a secondary battery, the top cover assembly including: a top cover plate; and a valve sleeve. The top cover plate includes an accommodation groove and a valve part protruding upward from a bottom wall of the accommodation groove, and the valve part is provided with at least one gas exhaust hole that communicates with an interior of the secondary battery. The valve sleeve is accommodated in the accommodation groove and covers the valve part, a gas exhaust passage that communicates with outside is disposed between the valve sleeve and the valve part, and the gas exhaust passage communicates with the at least one gas exhaust hole.

In an embodiment, the valve sleeve is made of a deformable material, the valve sleeve is configured to deform under a force applied by gas exhausted from the at least one gas exhaust hole so as to form the gas exhaust passage between the valve sleeve and the valve part, and the valve sleeve is configured to be in tight coupling with the valve part when the force applied by the gas is smaller than a force under which the valve sleeve begins to deform.

In an embodiment, the top cover assembly further includes a valve cover connected to the top cover plate. The valve cover is in position-limit fit with the valve sleeve in a height direction of the secondary battery.

In an embodiment, the valve cover seals an opening of the accommodation groove, and an upper surface of the valve cover is coplanar with or below a lower surface of the top cover plate, the valve cover is provided with a venting hole that communicates with outside, and the venting hole communicates with the gas exhaust passage via the accommodation groove.

In an embodiment, an orthographic projection of the venting hole in the height direction of the secondary battery at least partially overlaps with an orthographic projection of the accommodation groove in the height direction of the secondary battery.

In an embodiment, the accommodation groove includes a pillar section and a cone section that communicate with each other, the pillar section is arranged above the cone section in the height direction of the secondary battery, and a part where the pillar section is connected to the cone forms position-fixed fit with the valve cover in the height direction of the secondary battery.

In an embodiment, the valve part is provided with a first groove, the first groove opening towards the valve sleeve and communicating with the at least one gas exhaust hole.

In an embodiment, a lower surface of the top cover plate is provided with a second groove, and the at least one gas exhaust hole is located in an area surrounded by an outline of the second groove.

In an embodiment, the at least one gas exhaust hole includes a plurality of gas exhaust holes, each of the plurality of gas exhaust holes communicates with the accommodation groove, and the plurality of gas exhaust holes is arranged at intervals.

The present disclosure further provides a secondary battery, including: an electrode assembly, a case, and the top cover assembly described above. The top cover assembly is connected at an opening of the case to form an encapsulation space, and the electrode assembly is encapsulated in the encapsulation space. The electrode assembly includes a first electrode plate, a second electrode plate and a separator disposed between the first electrode plate and the second electrode plate. The top cover assembly includes a first electrode terminal electrically connected to the first electrode plate, and a second electrode terminal electrically connected to the second electrode plate.

It should be understood that the foregoing general description and the following detailed description are merely exemplary and are not intended to limit the present disclosure.

REFERENCE SIGNS

Figure 1:
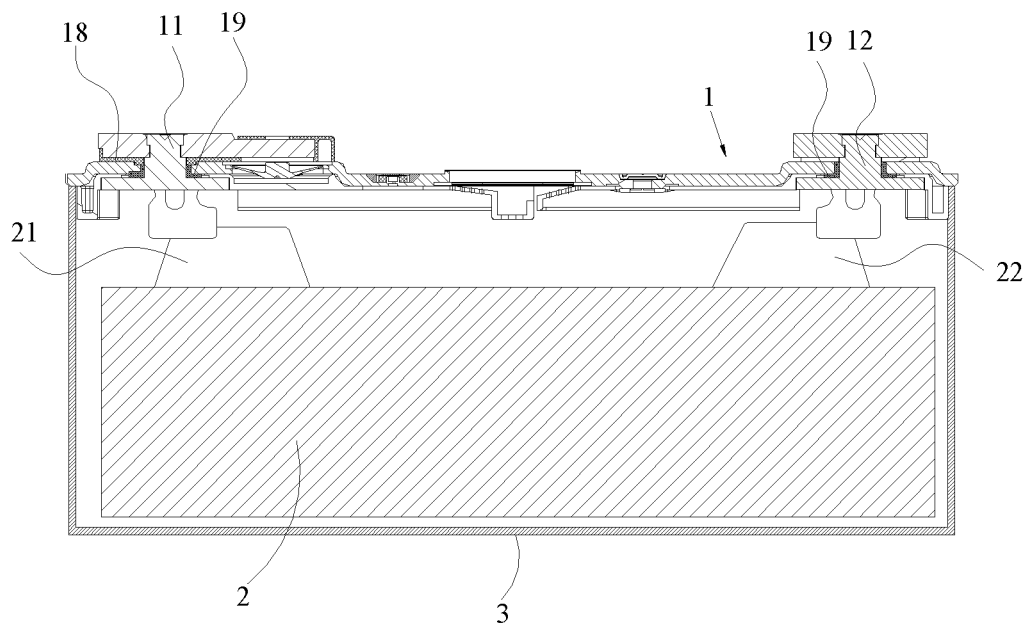
FIG. 1 is a cross-sectional view of a secondary battery according to an embodiment of the present disclosure.

1—top cover assembly;
   11—first electrode terminal;
   12—second electrode terminal;
   13—top cover plate;
      130—accommodation groove;
         130a—pillar section;
         130b—cone section;
      132—valve part;
         1320—gas exhaust hole;
         1322—first groove;
         1324—second groove;
   14—short circuit member;
      140—deformable plate;
      142—conductive plate;
   15—vent;
   16—valve sleeve;
   17—valve cover;
      170—venting hole;
   18—insulating member;
   19—seal ring;
2—electrode assembly;
21—first tab;
22—second tab;
3—case.

The drawings herein are incorporated into and constitute a part of the present specification, illustrate embodiments of the present disclosure and explain principles of the present disclosure together with the specification.

DESCRIPTION OF EMBODIMENTS

The present disclosure will be further described in details in the following with specific embodiments and with reference to the accompanying drawings.

It should be understood that, the terms such as "upper", "lower", "left", "right" and the like are used to indicate positions shown in the drawing, instead of being construed as limitations of the embodiment of the present disclosure. In addition, when an element is described as being "on" or "under" another element in the context, it should be understood that the element can be directly or via an intermediate element located "on" or "under" another element.

With reference to FIG. 1, an embodiment of the present disclosure provides a secondary battery. The secondary battery includes a top cover assembly 1 of the secondary battery (hereinafter referred to as a top cover assembly 1), an electrode assembly 2, and a case 3. The top cover assembly 1 seals and is connected to an opening of the case 3 and then an encapsulation space is formed inside the case 3. The electrode assembly 2 is encapsulated in the encapsulation space.

The electrode assembly 2 includes a first electrode plate, a second electrode plate, and a partition plate located between the first electrode plate and the second electrode plate. The electrode assembly 2 may be formed by spirally winding the three. The electrode assembly 2 may also be formed by stacking multiple first electrode plates, multiple separators and multiple second electrode plates, which are in a form of a plate shape or a sheet shape.

The first electrode plate and the second electrode plate have different polarities. The first electrode plate includes a first coated area coated with an active material and a first tab 21 not coated with an active material. The second electrode plate includes a second coated area coated with an active material and a second tab 22 not coated with an active material. The top cover assembly 1 includes a first electrode terminal 11 and a second electrode terminal 12. The first tab 21 is connected to the first electrode terminal 11, and the second tab 22 is connected to the second electrode terminal 12, so as to achieve outputting of electric energy of the electrode assembly 2.

Figure 2:
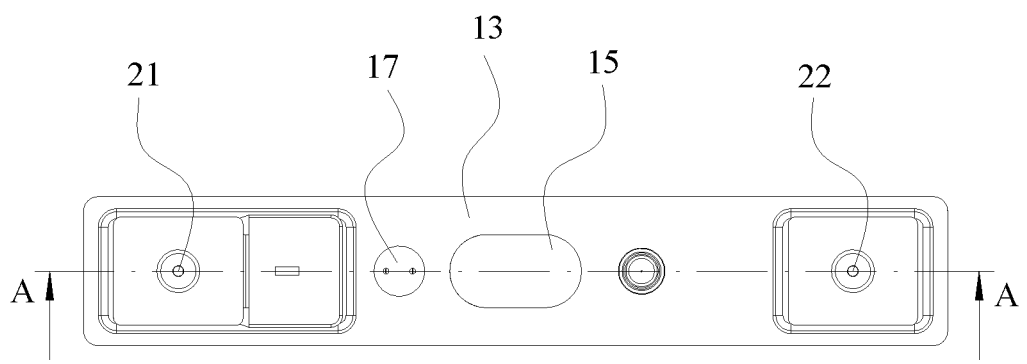
FIG. 2 is a top view of a top cover assembly of a secondary battery according to an embodiment of the present disclosure.
Figure 3:
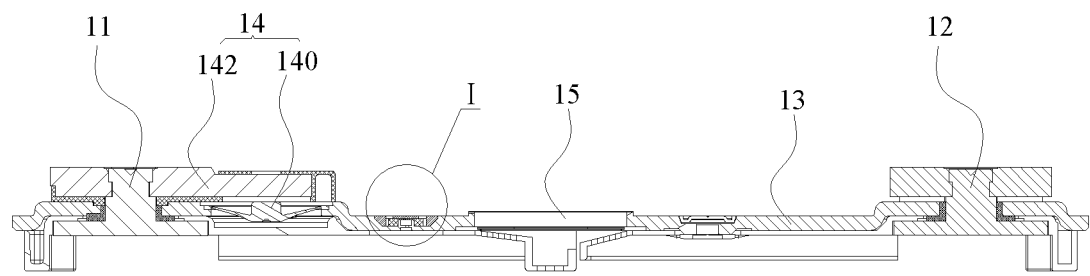
FIG. 3 is a cross-sectional view of a top cover assembly of a secondary battery according to an embodiment of the present disclosure.

With reference to FIG. 2 and FIG. 3, the top cover assembly 1 includes a top cover plate 13. The top cover assembly 1 seals and is connected to the case 3 via the top cover plate 13, for example, by welding. Further, the top cover plate 13 serves as a base of the top cover assembly 1 to provide a mounting carrier for other components of the top cover assembly 1, such as the first electrode terminal 11, the second electrode terminal 12, a short circuit member 14 or the like.

The short circuit member 14 can improve safety of the secondary battery when the secondary battery is overcharged. In an embodiment shown in FIG. 3, the short circuit member 14 includes a deformable plate 140 and a conductive plate 142. The deformable plate 140 is connected to the top cover plate 13. The top cover plate 13 is insulated from the first electrode terminal 11 and electrically connected to the second electrode terminal 12. The conductive plate 142 is connected to the first electrode terminal 11. When the internal pressure of the secondary battery reaches a deforming pressure of the deformable plate 140, the deformable plate 140 deforms to get into contact with the conductive plate 142. At this time, an external short circuit is formed for the secondary battery, and in this short circuit, a large short-circuit current fuses a fuse member connected in the circuit. That is, the overcharge of the secondary battery is stopped.

In addition, the top cover assembly 1 further includes a vent 15. The vent 15 may open when the internal pressure of the secondary battery reaches its opening pressure, thereby reducing a risk of explosion occurring in the secondary battery. The opening pressure of the vent 15 can be larger than the deforming pressure of the deformable plate 140.

The short circuit member 14 and the vent 15 described above can improve the safety of the secondary battery, but neither of them can solve the problem of gas exhausting when gas is slowly produced inside the secondary battery under a normal operating condition. Therefore, the present disclosure provides a solution which can solve the problem of gas exhausting described above without causing failure of the deformable plate 140 and the vent 15.

Figure 4:
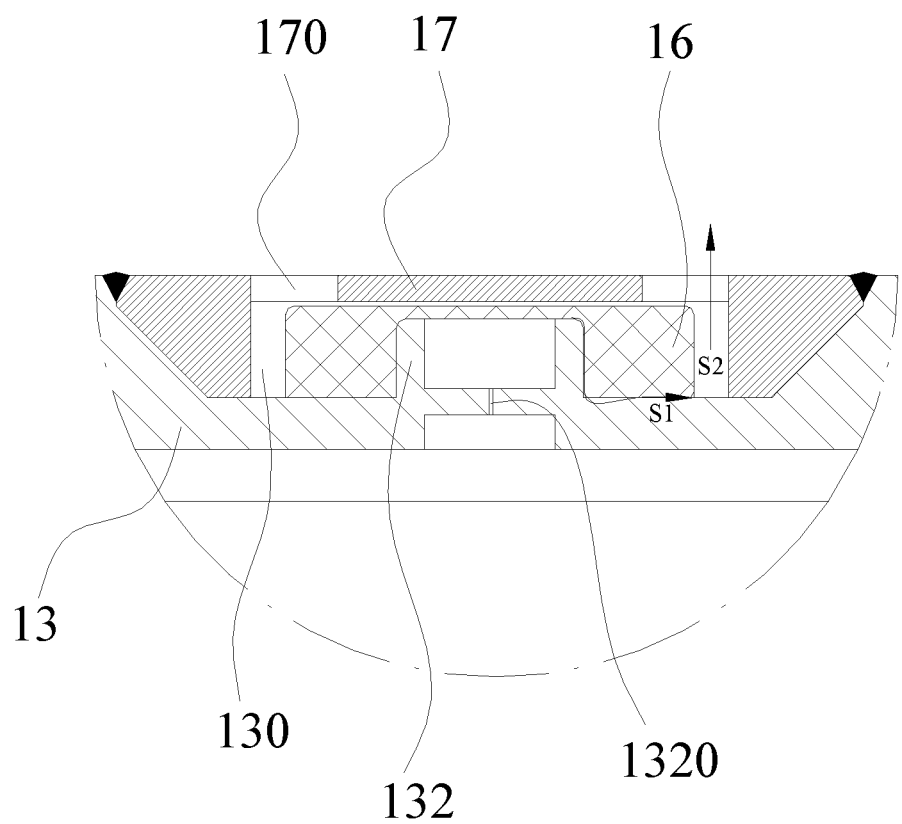
FIG. 4 is an enlarged view of portion I of FIG. 3.

With reference to FIG. 4, the top cover plate 13 includes an accommodation groove 130 and a valve part 132 protruding upward from a bottom wall of the accommodation groove 130. The valve part 132 occupies only a partial space of the accommodation groove 130. The valve part 132 is provided with a gas exhaust hole 1320 that communicates with an interior of the secondary battery.

In addition, the top cover assembly 1 further includes a valve sleeve 16, the valve sleeve 16 is structured as a hollow pillar with a top cover, and the valve part 132 is accommodated in the hollow pillar of the valve sleeve 16. Accordingly, the valve sleeve 16 also covers the gas exhaust hole 1320.

The valve sleeve 16 is accommodated in the accommodation groove 130, and a gas exhaust passage is arranged between the valve sleeve 16 and the valve part 132 for exhausting gas to outside. The gas exhaust passage communicates with the gas exhaust hole 1320.

In an embodiment, the valve sleeve 16 can be made of a deformable material, such as fluoroelastomer or ethylene propylene rubber. In this case, the gas exhaust passage between the valve part 132 and the valve sleeve 16 can be formed by deformation of the valve sleeve 16. Specifically, the valve sleeve 16 may cover the valve part 132 by means of interference fit. When the gas exhausted from the gas exhaust hole 1320 acts on the valve sleeve 16, the valve sleeve 16 deforms towards a direction away from the valve part 132 under a force. In this case, the valve sleeve 16 is separated from the valve part 132, i.e., a gap is formed between the valve sleeve 16 and the valve part 132, and this gap is a gas exhaust passage.

When an applied force of the gas is smaller than a force under which the valve sleeve 16 deforms, the valve sleeve 16 is restored from deformation. In this case, the valve sleeve 16 and the valve part 132 are restored to interference fit and tight coupling, thereby preventing impurities from entering the interior of the battery. This can achieve one-way gas exhausting in a direction and sealing in an opposite direction.

It should be understood that in the above embodiments, a critical pressure under which the valve sleeve 16 deforms can be changed by adjusting an elasticity modulus of the valve sleeve 16.

Optionally, in other embodiments, the gas exhaust passage may also be formed in a gap reserved between the valve sleeve 16 and the valve part 132. Meanwhile, in order to prevent external impurities, the valve sleeve 16 and the valve part 132 can adopt a labyrinth sealing structure, which can also achieve one-way gas exhausting in a direction and sealing in an opposite direction.

When gas is slowly produced inside the secondary battery, the gas may enter the gas exhaust passage via the gas exhaust hole 1320 and then be exhausted to outside the secondary battery through the gas exhaust passage. It should be noted that a size of the gas exhaust hole 1320 can be determined according to a gas exhausting rate thereof. For example, the gas exhausting rate of the gas exhaust hole 1320 may be set to be smaller than 1/10 of a gas production rate inside the secondary battery. In this way, the internal pressure of the secondary battery resulting from slow gas production then can be reduced without affecting normal deformation of the deformable plate 140 and normal opening of the vent 15. Therefore, the safety of the secondary battery can be improved. Herein, the gas exhaust hole 1320 can be formed by means of laser processing.

The top cover assembly 1 may further include a valve cover 17. The valve cover 17 is connected to the top cover plate 13 and can be in position-limit fit with the valve sleeve 16 in a height direction of the secondary battery. Under the pressure of the gas exhausted from the gas exhaust hole 1320, the valve sleeve 16 is at risk of escaping from the valve part 132. The valve cover 17 can provide position limit for the valve sleeve 16 to prevent the valve sleeve 16 from escaping from the valve part 132, thereby reducing the above risk.

A structure of the valve cover 17 may be set as required, as long as it satisfies position-limit fit with the valve sleeve 16. In an embodiment, as shown in FIG. 4, the valve cover 17 is connected to the top cover plate 13 and seals an opening of the accommodation groove 130. The valve cover 17 is also accommodated in the accommodation groove 130 and covers the valve sleeve 16.

In an example, an upper surface of the valve cover 17 may not go beyond an upper surface of the top cover plate 13, so that the valve cover 17 can be prevented from interfering with external objects.

In the embodiments described above, the valve cover 17 covers the valve sleeve 16 and the valve part 132 in a wrap-around structure. In this way, on the one hand, the position-limit fit with the valve sleeve 16 can be effectively achieved, and on the other hand, a risk of impurities entering inside the secondary battery can be reduced, thereby effectively protecting the second battery.

In order to ensure that gas can exhaust from the secondary battery, the valve cover 17 is further provided with a venting hole 170, and the venting hole 170 communicates with the accommodation groove 130. Thus, the venting hole 170 can communicate with the gas exhaust passage via the accommodation groove 130. In this case, a partial space of the accommodation groove 130 also serves as a passage for exhausting gas.

Further, in order to exhaust gas more smoothly, an orthographic projection of the venting hole 170 in the height direction of the second battery at least partially overlaps with an orthographic projection of the accommodation groove in the same direction. In this way, the accommodation groove 130 is in direct communication with the venting hole 170, thereby shortening a path connecting the two and thus reducing resistance against gas exhausting.

It should be noted that the valve cover 17 is not limited to the structure shown in FIG. 4 and may also have other structures depending on different operation conditions of the secondary battery.

Figure 5:
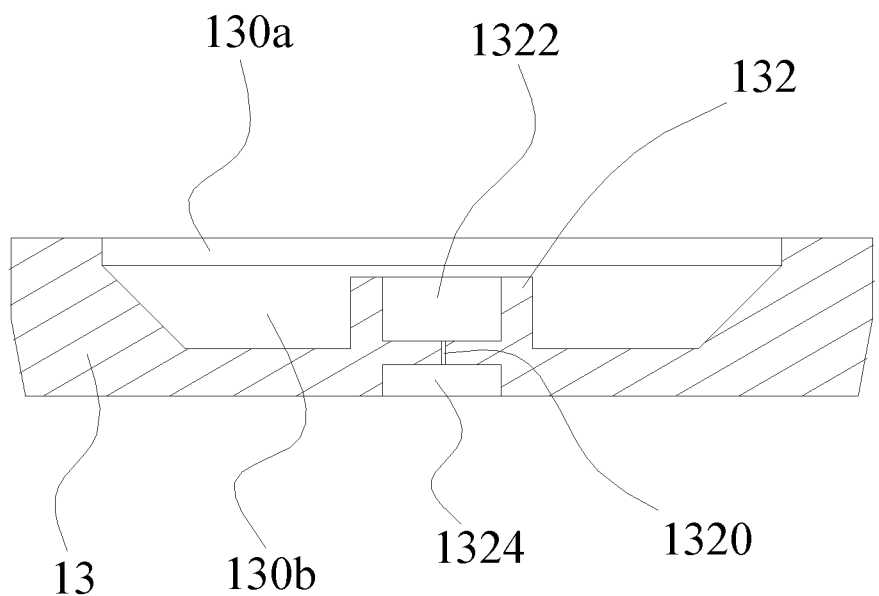
FIG. 5 is a cross-sectional view of a partial structure of a top cover plate according to an embodiment of the present disclosure.

With reference to FIG. 5, the accommodation groove 130 includes a pillar section 130a and a cone section 130b that communicating with each other. The pillar section 130a is arranged above the cone section 130b in the height direction of the secondary battery. Further, along a direction from an end of the cone section 130b connected to the pillar section 130a to the other end of the cone section 130b, an opening size (for example an inner diameter) of the cone section 130b gradually decreases. In this way, a part where the pillar section 130a is connected to the cone section 130b is used to achieve and position-fixed fit with the valve cover 17, and the valve cover 17 seals and is connected to the top cover plate 13 at this position.

The accommodation groove 130 being formed as the structure described above can bring an advantage that a small amount of processing error is allowed for the valve cover 17 during processing, in which case the valve cover 17 still seals and is connected to the top cover plate 13.

It should be noted that, in order to further reduce risk of external impurities entering the interior of the secondary battery, the venting hole 170 may have a smaller size, as long as the gas can be smoothly exhausted. For example, the venting hole 170 may be shaped as a circle hole with its width being smaller than 1 mm. It should be noted that, the venting hole 170 may have other shapes and sizes, and the present disclosure is not limited herein.

When being exhausted, the gas passes the gas exhaust passage (arrow S1 in FIG. 4) and a partial space of the accommodation groove 130 (arrow S2 in FIG. 4). Herein, the S1 section is a gap formed between the valve part 132 and the deformed valve sleeve 16, and the S2 section is a gap reserved between an outer wall of the valve sleeve 16 and an inner wall of the valve cover 17 in the accommodation groove 130.

With further reference to FIG. 5, a first groove 1322 is provided in the valve part 132. The first groove 1322 opens towards the valve sleeve 16 and communicates with the gas exhaust hole 1320. With such arrangement, the gas exhausted from the gas exhaust hole 1320 may gradually gather inside the first groove 1322, and the arrangement of the first groove 1322 may increase the contact area between the gas and the valve sleeve 16. Therefore, when the gas pressure acts on the valve sleeve 16, the valve sleeve 16 has a larger deformed area, thereby allowing the valve sleeve 16 to deform more easily so as to form a more reliable gas exhaust passage.

Optionally, a second groove 1324 is further provided on a lower surface of the valve part 132, and the gas exhaust hole 1320 is disposed in an area surrounded by an outline of the second groove 1324. With such arrangement, a groove wall of the second groove 1324 can protect the gas exhaust hole 1320, so that electrolyte impurities and other contaminants can be prevented from entering and blocking the gas exhaust hole 1320. This can allow gas inside the secondary battery to enter the gas exhaust hole 1320 smoothly.

Figure 6:
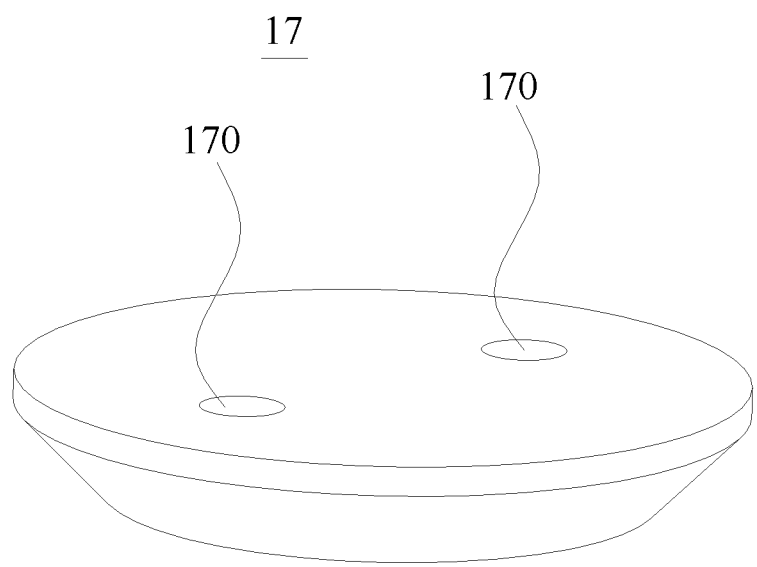
FIG. 6 is a schematic diagram of a valve cover according to an embodiment of the present disclosure.

With reference to FIG. 6, a plurality of venting holes 170 may be provided, and each of the plurality of venting holes communicates with the accommodation groove 130. Further, the plurality of venting holes 170 is arranged at intervals.

In this embodiment, an orthographic projection of each venting hole 170 in the height direction of the secondary battery overlaps with the orthographic projection of the accommodation groove 130 in the same direction, thereby increasing the number of passages for exhausting gas and thus further reducing resistance against gas exhausting.

With further reference to FIG. 1, the top cover assembly 1 further includes an insulating member 18. The insulating member 18 is disposed on the upper surface of the top cover plate 13 so as to insulate the conductive plate 142 from the top cover plate 13. The insulating member 18 may be attached to the upper surface of the top cover plate 13 by injection molding, but the present disclosure is not limited herein.

The top cover assembly 1 further includes seal rings 19. Each of the first electrode terminal 11 and the second electrode terminal 12 is sleeved by a seal ring 19. The seal ring 19 is located between the first electrode terminal 11 and the top cover plate 13, and is in tight coupling with both of them. The seal ring 19 is located between the second electrode terminal 12 and the top cover plate 13, and is in tight coupling with both of them. The first electrode terminal 11 and the second electrode terminal 12 extend from hollow parts of respective seal rings 19 to outside the top cover plate 13.

The above-described embodiments are merely preferred embodiments of the present disclosure and are not intended to limit the present disclosure. Various modifications and changes may be made to the present disclosure by those skilled in the art. However, any modifications, equivalent substitutions and improvements made within the principle of the present disclosure shall fall into the protection scope of the present disclosure.

What is claimed is:

1. A top cover assembly of a secondary battery, the top cover assembly comprising:
    a top cover plate; and
    a valve sleeve,
    wherein the top cover plate comprises an accommodation groove and a valve part protruding upward from a bottom wall of the accommodation groove, and the valve part is provided with at least one gas exhaust hole that communicates with an interior of the secondary battery;
    the valve sleeve is accommodated in the accommodation groove and covers the valve part, a gas exhaust passage that communicates with outside is disposed between the valve sleeve and the valve part, and the gas exhaust passage communicates with the at least one gas exhaust hole;
    the top cover plate is provided with a first groove and a second groove, a first surface of the valve part facing towards the valve sleeve is recessed away from the valve sleeve to form the first groove, the valve part comprises a side wall and a bottom wall that define the first groove, the at least one gas exhaust hole is provided in the bottom side, and the first groove communicates with the at least one gas exhaust hole; and
    a second surface of the top cover plate facing towards the valve sleeve is recessed towards the valve sleeve to form the second groove, and the at least one gas exhaust hole is located in an area surrounded by an outline of the second groove.

2. The top cover assembly according to claim 1, wherein the valve sleeve is made of a deformable material, the valve sleeve is configured to deform under a force applied by gas exhausted from the at least one gas exhaust hole so as to form the gas exhaust passage between the valve sleeve and the valve part, and the valve sleeve is configured to be in tight coupling with the valve part when the force applied by the gas is smaller than a force under which the valve sleeve begins to deform.

3. The top cover assembly according to claim 1, further comprising a valve cover connected to the top cover plate, wherein the valve cover is in position-limit fit with the valve sleeve in a height direction of the secondary battery.

4. The top cover assembly according to claim 3, wherein the valve cover seals an opening of the accommodation groove, and an upper surface of the valve cover is coplanar with or below a lower surface of the top cover plate, and
    the valve cover is provided with a venting hole that communicates with outside, and the venting hole communicates with the gas exhaust passage via the accommodation groove.

5. The top cover assembly according to claim 4, wherein an orthographic projection of the venting hole in the height direction of the secondary battery at least partially overlaps with an orthographic projection of the accommodation groove in the height direction of the secondary battery.

6. The top cover assembly according to claim 3, wherein the accommodation groove comprises a pillar section and a cone section that communicate with each other, the pillar section is arranged above the cone section in the height direction of the secondary battery, and a part where the pillar section is connected to the cone forms position-fixed fit with the valve cover in the height direction of the secondary battery.

7. The top cover assembly according to claim 1, wherein the at least one gas exhaust hole comprises a plurality of gas exhaust holes, each of the plurality of gas exhaust holes communicates with the accommodation groove, and the plurality of gas exhaust holes is arranged at intervals.

8. A secondary battery, comprising an electrode assembly, a case and the top cover assembly according to claim 1,
    wherein the top cover assembly is connected at an opening of the case to form an encapsulation space, and the electrode assembly is encapsulated in the encapsulation space, the electrode assembly comprises a first electrode plate, a second electrode plate and a separator disposed between the first electrode plate and the second electrode plate; and the top cover assembly comprises a first electrode terminal electrically connected to the first electrode plate, and a second electrode terminal electrically connected to the second electrode plate.

9. The top cover assembly according to claim 1, wherein a size of one of the at least one gas exhaust hole is determined based on a gas exhausting rate in such a manner that the gas exhausting rate of the gas exhaust hole is smaller than $1/10$ of a gas production rate inside the secondary battery.

* * * * *